US012799310B2

(12) United States Patent
Lu et al.

(10) Patent No.: US 12,799,310 B2
(45) **Date of Patent: *Nov. 17, 2026**

(54) HIGH-DENSITY POLYETHYLENE COMPOSITIONS HAVING IMPROVED PROCESSABILITY AND MOLDED ARTICLES MADE THEREFROM

(71) Applicant: Dow Global Technologies LLC, Midland, MI (US)

(72) Inventors: Keran Lu, Pearland, TX (US); Stephanie M. Whited, South Charleston, WV (US); Mridula Kapur, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 399 days.

This patent is subject to a terminal disclaimer.

(21) Appl. No.: 18/264,593

(22) PCT Filed: May 13, 2022

(86) PCT No.: PCT/US2022/029235

§ 371 (c)(1),
(2) Date: Aug. 8, 2023

(87) PCT Pub. No.: WO2022/245661

PCT Pub. Date: Nov. 24, 2022

(65) Prior Publication Data

US 2024/0117165 A1 Apr. 11, 2024

Related U.S. Application Data

(60) Provisional application No. 63/190,528, filed on May 19, 2021.

(51) Int. Cl.
*C08L 23/0807* (2025.01)
*C08L 23/06* (2006.01)

(52) U.S. Cl.
CPC .......... *C08L 23/0815* (2013.01); *C08L 23/06* (2013.01); *C08L 2203/10* (2013.01); *C08L 2205/025* (2013.01); *C08L 2207/062* (2013.01)

(58) Field of Classification Search
None
See application file for complete search history.

(56) References Cited

U.S. PATENT DOCUMENTS 6,242,545 B1 * 6/2001 Jejelowo ................ C08F 10/00
526/943
7,396,878 B2 7/2008 Lustiger et al.
(Continued)

FOREIGN PATENT DOCUMENTS

CA 3147178 3/2021
EP 1655338 5/2006
(Continued)

OTHER PUBLICATIONS

PCT/US2022/029235, International Search Report and Written Opinion with a mailing date of Jul. 25, 2022.

*Primary Examiner* — Satya B Sastri
(74) *Attorney, Agent, or Firm* — Jacob R. Graham

(57) ABSTRACT

Bimodal high density polyethylene compositions can achieve an improved balance of stress crack resistance and processibility by selecting the higher molecular weight and lower molecular weight components such that (1) the higher molecular weight component has a molecular weight distribution below 4, (2) the lower molecular weight component has a complementary density of at least 0.976 g/cm$^3$, and (3) the overall bimodal copolymer has a relatively broad molecular weight distribution. This combination of properties can provide improved balance of stress crack resistance and processibility.

15 Claims, 1 Drawing Sheet

GPC Chromatogram of Inventive Example 1 and Inventive Example 2

(56) References Cited

U.S. PATENT DOCUMENTS

| | | | | |
|---|---|---|---|---|
| 7,875,690 | B2 | 1/2011 | Graham et al. | |
| 2006/0281867 | A1 | 12/2006 | Jaker | |
| 2008/0221273 | A1* | 9/2008 | Michie, Jr. | C08L 23/08 526/348 |
| 2009/0283939 | A1 | 11/2009 | Turner et al. | |

FOREIGN PATENT DOCUMENTS

| | | |
|---|---|---|
| WO | 2007130515 | 11/2007 |
| WO | 2008002379 | 1/2008 |
| WO | 2008002524 | 1/2008 |
| WO | 2008136849 | 11/2008 |
| WO | 2010088265 | 8/2010 |
| WO | 2013040676 | 3/2013 |
| WO | 2014089670 | 6/2014 |
| WO | 2015101668 | 7/2015 |
| WO | 2016033018 | 3/2016 |
| WO | 2018147968 | 8/2018 |
| WO | 2019011967 | 1/2019 |

* cited by examiner

GPC Chromatogram of Inventive Example 1 and Inventive Example 2
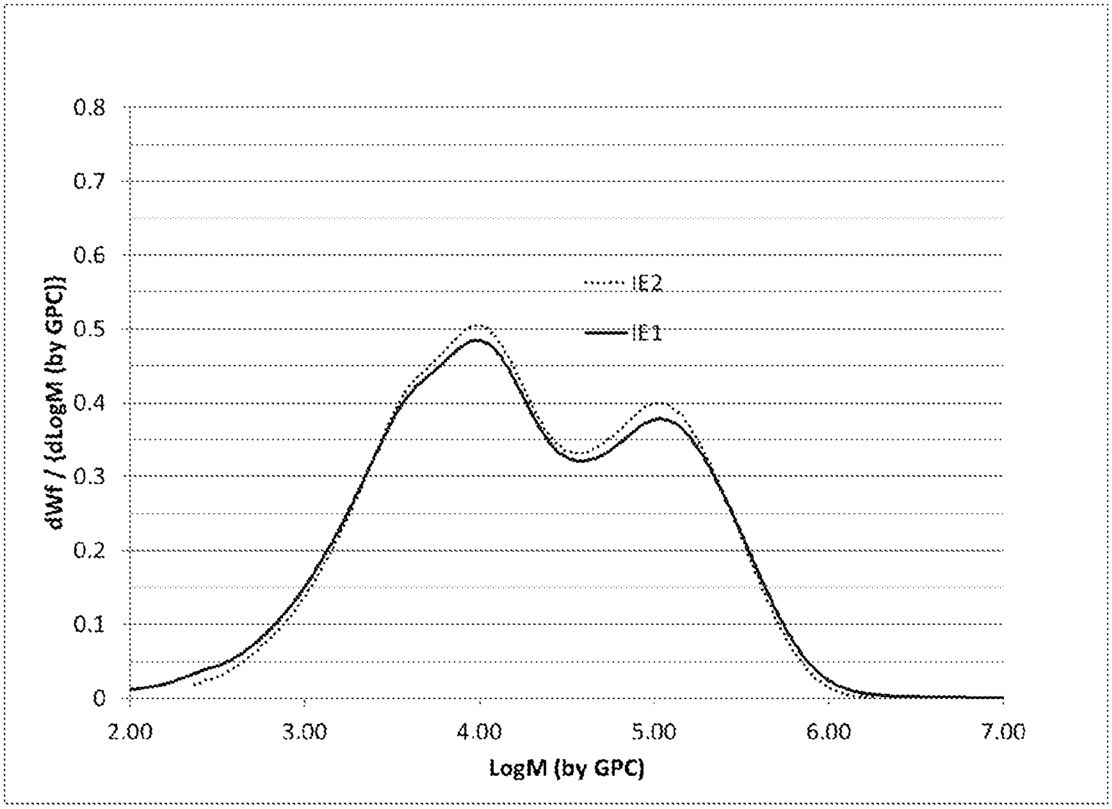

HIGH-DENSITY POLYETHYLENE COMPOSITIONS HAVING IMPROVED PROCESSABILITY AND MOLDED ARTICLES MADE THEREFROM

FIELD OF INVENTION

The instant invention relates to high-density polyethylene compositions having improved processability and molded articles made from them.

BACKGROUND OF THE INVENTION

Polyethylene resins can be molded into useful articles using molding processes such as compression molding and injection molding. Among the molded articles made this way, beverage containers and their closures for carbonated soft drinks are a common product.

In compression molding processes, a two-piece mold provides a cavity having the shape of a desired molded article. The mold is heated, and an appropriate amount of molten molding compound from an extruder is loaded into the lower half of the mold. The two parts of the mold are brought together under pressure. The molding compound, softened by heat, is thereby welded into a continuous mass having the shape of the cavity. The continuous mass may be hardened via chilling under pressure in the mold.

In injection molding processes, molding compound is fed into an extruder via a hopper. The extruder conveys, heats, melts, and pressurizes the molding compound to a form a molten stream. The molten stream is forced out of the extruder through a nozzle into a relatively cool mold held closed under pressure thereby filling the mold. The melt cools and hardens until fully set-up. The mold then opens, and the molded part is removed.

The polyethylene resins used for molding articles desirably have:

- high tensile and/or flexural modulus, so that the quantity of resin used can be minimized, reducing weight of the finished article. High modulus is often associated with a higher density resin.
- low viscosity when melted, so that they can be injection molded into complex shapes quickly and easily without voids. Low melt viscosity, particularly under shear conditions that occur in molding, is a key element in the processability of the resin.
- high resistance to environmental stress cracking, so that finished articles do not crack and leak during storage and handling.

However, polyethylene resins with higher density and/or lower melt viscosity often also have lower environmental stress crack resistance. The search for resins that can improve the balance of these properties is described—for example—in the following patent references: U.S. Pat. No. 7,153,909B2; U.S. Pat. No. 7,396,878 B2; U.S. Pat. No. 8,697,806B2; U.S. Pat. No. 9,056,970B2; U.S. Pat. No. 9,175,111B2; U.S. Pat. No. 9,371,442 B2; U.S. Pat. No. 9,988,473B2; WO 2013/040676 A1; and WO 2014/089670 A1.

It is desirable to further improve the balance of density, processability, and/or environmental stress crack resistance in high-density polyethylene compositions.

SUMMARY OF THE INVENTION

The present invention includes high-density polyethylene compositions, molded articles made therefrom, and methods of making such molded articles.

One aspect of the present invention is a high-density polyethylene composition. In some embodiments, the high-density polyethylene composition comprises:

a. 35 to 60 weight percent of a higher molecular weight ethylene copolymer component (HMW Component) having:
   i. a flow index ($I_{21}$) of at least 4 g/10 min,
   ii. a density of from 0.922 to 0.931 g/cm$^3$, and
   iii. a molecular weight distribution (Mw/Mn) of less than 4.0, and b. 40 to 65 weight percent of a lower molecular weight ethylene homopolymer or copolymer component (LMW Component) having a complementary density (CD) of greater than 0.975 g/cm$^3$ according to the following formula, wherein weight percentages are based on percentages of the combined weight of the HMW and LMW Components only:

$$CD = \frac{LMW \text{ Component Weight Percent/100}}{\left(\frac{1}{\text{Overall Density}}\right) - \left(\frac{HMW \text{ Component Weight Percent/100}}{HMW \text{ Component Density}}\right)};$$

and wherein the high-density polyethylene composition has overall:

i. a melt index ($I_2$) of 4 to 19 g/10 min, and
ii. a density of greater than 0.953 g/cm$^3$.

In an alternate embodiment, the present invention is a bimodal polyethylene composition. In some embodiments, the bimodal polyethylene composition comprises a higher molecular weight ethylene copolymer component (HMW Component) and a lower molecular weight ethylene homopolymer or copolymer component (LMW Component), wherein: a. The composition has a density from 0.953 to 0.965 g/cm$^3$; b. The composition has a molecular weight distribution ($M_w/M_n$) from 8 to 25; and c. The composition has a melt index ($I_2$) of from 5.5 to 19 g/10 min; and d. The composition has an ESCR of at least 300 hours, as measured by ASTM D-1693, condition B at 50 °C, using 10 percent Branched Octylphenoxy Poly (Ethyleneoxy) Ethanol.

A molded article according to the present invention comprises a high-density polyethylene composition described above.

The method of making a molded article according to the present invention comprises the steps of: (1) providing a high-density polyethylene composition as described above; and (2) compression molding or injection molding the high-density polyethylene composition thereby forming the molded article.

BRIEF DESCRIPTION OF THE DRAWINGS

FIG. 1 shows the molecular weight distribution of two examples of the inventive composition, measured using gel permeation chromatography as described in this application.

DETAILED DESCRIPTION OF THE INVENTION

The high-density polyethylene composition of the instant invention is a bimodal composition, which means it comprises a higher molecular weight (HMW) component, and a lower molecular weight (LMW) component. "Higher molecular weight" means that the HMW Component is calculated to have a higher molecular weight than the LMW Component, and "lower molecular weight" means that the LMW Component is calculated to have a lower molecular weight than the HMW Component.

Higher Molecular Weight Component

The higher molecular weight component is a copolymer of ethylene and one or more alpha-olefin comonomers. Content of comonomer is conveniently measured based on the number of short-chain branches per 1000 carbon atoms, as described in the Test Methods below. In some embodiments of the inventive composition, the HMW Component can contain at least 2 short-chain branches per 1000 carbon atoms, or at least 2.5 short-chain branches per 1000 carbon atoms, or at least 2.75 short-chain branches per 1000 carbon atoms, and can contain at most 10 short-chain branches per 1000 carbon atoms, or at most 4.5 short-chain branches per 1000 carbon atom.

The alpha-olefin comonomers of the copolymer typically have at most 20 carbon atoms. For example, the alpha-olefin comonomers may have 3 to 10 carbon atoms or 4 to 8 carbon atoms. Exemplary alpha-olefin comonomers include, but are not limited to, propylene, 1-butene, 1-pentene, 1-hexene, 1-heptene, 1-octene, 1-nonene, 1-decene, and 4-methyl-1-pentene. In some embodiments, the alpha-olefin comonomers can be selected from the group consisting of 1-butene, 1-hexene, and 1-octene, or from the group consisting of 1-butene and 1-hexene.

In some embodiments where the properties of the HMW Component are measured, the HMW Component can have a density in the range of 0.922 to 0.931 g/cm$^3$. In some embodiments, the density of the HMW Component can be at least 0.923 g/cm$^3$, or at least 0.924 g/cm$^3$, and can be at most 0.930 g/cm$^3$, or at most 0.929 g/cm$^3$, or at most 0.928 g/cm$^3$. In certain embodiments, a density of 0.933 g/cm$^3$ can have deleterious effects on the balance of stiffness, processibility, and environmental stress crack resistance in the resulting resin. Density and other properties of the HMW Component can be measured by taking a sample of the HMW-Component before addition or polymerization of the LMW Component.

In some embodiments where the properties of the HMW Component are measured, the HMW Component can have a flow index ($I_{21}$) of at least 4 g/10 minutes. In some embodiments, the flow index ($I_{21}$) of the HMW Component can be at least 4.5 g/10 minutes, or at least 5 g/10, or at least 6 g/10. In some embodiment, the flow index ($I_{21}$) of the HMW Component can be at most 10 g/10 minutes, or at most 9 g/10 minutes, or at most 8 g/10 minutes.

In some embodiments where the properties of the HMW Component are measured, the number average molecular weight ($M_n$) of the HMW Component can be at least 40,000 g/mol., or at least 48,000 g/mol., or at least 56,000 g/mol., and can be at most 85,000 g/mol., or at most 76,000 g/mol., or at most 67,000 g/mol.

In some embodiments where the properties of the HMW Component are measured, the weight average molecular weight ($M_w$) of the HMW Component can be at least 100,000 g/mol., or at least 131,000 g/mol., or at least 162,000 g/mol., and can be at most 250,000 g/mol., or at most 215,000 g/mol., or at most 180,000.

In some embodiments where the properties of the HMW Component are measured, the molecular weight distribution ($M_w/M_n$) of the HMW Component can be at least 2, or at least 2.1, or at least 2.5, and can be at most 3.8, or at most 3.6, or at most 3.3.

In certain embodiments, the HMW Component is substantially free of long chain branching. Long chain branching refers to branching greater than 100 carbons in length. Substantially free of long chain branching, as used herein, refers to an ethylene polymer substituted with less than 0.1 long chain branches per 1000 carbons or less than 0.01 long chain branches per 1000 carbons. The presence of long chain branches is typically determined according to the methods known in the art, such as gel permeation chromatography coupled with low angle laser light scattering detector (GPC-LALLS) and gel permeation chromatography coupled with a differential viscometer detector (GPC-DV) and NMR.

The HMW Component makes up 35 weight percent to 60 weight percent of the polyethylene resins in the composition. In some embodiments, the HMW Component can make up at least 38 weight percent of the polyethylene resins in the composition, or at least 40 weight percent, or at least 42 weight percent, and can make up at most 58 weight percent of the polyethylene resins in the composition, or at most 55 weight percent, or at most 50 weight percent.

Lower Molecular Weight Component

The high-density polyethylene composition of this invention also comprises a lower molecular weight polyethylene component (LMW Component).

It is useful to characterize the LMW Component based on its "complementary density". Complementary density is a calculated density using the following formula:

$$CD = \frac{LMW\text{ Component Weight Percent/100}}{\left(\frac{1}{\text{Overall Density}}\right) - \left(\frac{HMW\text{ Component Weight Percent/100}}{HMW\text{ Component Density}}\right)};$$

wherein

| | |
|---|---|
| CD is: | The complementary density of the LMW Component |
| Overall Density is: | The density of the overall composition containing both the HMW Component and the LMW Component |
| HMW Component Weight Percent is: | The weight of HMW Component as a percentage of the combined weight of the HMW Component and the LMW Components |
| HMW Component Density is: | The density of the HMW Component. |
| LMW Component Weight Percent is: | The weight of LMW Component as a percentage of the combined weight of the HMW Component and the LMW Components. |

The complementary density is easy to measure when the LMW Component is produced in a second or later reactor of a multi-reactor system, because it does not require a separate LMW sample. Further, complementary density takes into account the effect of chain packing interactions and component mixing effectiveness of the composition. Complementary density can be increased relative to the ASTM-measured density through improved mixing of components (through well-known methods), reducing thermal quenching rates of products during crystallization to promote improved chain packing, reducing comonomer incorporated into the LMW Component, and decreasing the molecular weight of the LMW Component.

Contrary to earlier work, in which the density of the LMW Component was kept low, we have found that a higher complementary density of the LMW Component (in combination with a moderately-low density and narrow molecular weight distribution in the HMW Component), results in improved combinations of stress crack resistance and processibility.

In some embodiments where the properties of the HMW Component are measured, the LMW Component has a complementary density (CD) of greater than 0.975 g/cm$^3$. In some embodiments, the complementary density of the LMW Component can be at least 0.976 g/cm$^3$ or at least 0.977 g/cm$^3$. In some embodiments, the complementary density of the LMW Component can be at most 0.992 g/cm$^3$ or at most 0.991 g/cm$^3$ or at most 0.990 g/cm$^3$.

In certain embodiments, the LMW Component is a polyethylene homopolymer or copolymer having a relatively low level of comonomer. When the LMW Component is a polyethylene homopolymer, at least 99.8 mole percent of repeating units are derived from ethylene.

When the LMW Component is a polyethylene copolymer, the description of the comonomers in the copolymer is the same as the description for the HMW Component. For example, the alpha-olefin comonomers of the copolymer can have at most 20 carbon atoms. In some embodiments, the alpha-olefin comonomers may have 3 to 10 carbon atoms or 4 to 8 carbon atoms. Exemplary alpha-olefin comonomers include, but are not limited to, propylene, 1-butene, 1-pentene, 1-hexene, 1-heptene, 1-octene, 1-nonene, 1-decene, and 4-methyl-1-pentene. In some embodiments, the alpha-olefin comonomers can be selected from the group consisting of 1-butene, 1-hexene, and 1-octene, or from the group consisting of 1-butene and 1-hexene. However, in some embodiments where the LMW Component has a relatively low level of comonomer, at least 99.5 mole percent of repeating units are derived from ethylene, or at least 99.7 mole percent or at least 99.8 mole percent.

When the LMW Component is made in the second stage of a two-stage polymerization, it is difficult to obtain a separate sample to directly measure density and melt-index of the LMW Component. However, the density and melt-index of the LMW Component can be estimated using models developed by producing a series of the LMW Component alone (without the first stage reaction) using the same equipment, reagents and reaction conditions, and measuring the density and melt-index of the separately-produced resins. In the current high-density polyethylene compositions, the LMW Component optionally has an estimated melt index ($I_2$) of at least 550 g/10 minutes or at least 700 g/10 minutes or at least 850 g/10 min. or at least 1000 g/10 min. The LMW Component optionally has an estimated melt index ($I_2$) of at most 5000 g/10 minutes or at most 4000 g/10 min. or at most 3500 g/10 min.

In some embodiments, the weight average molecular weight (M w) of the LMW Component can be at least 11,000 or at least 12,000 or at least 13,000, and can be at most 22,000, or at most 20,000, or at most 19,000.

In some embodiments, the LMW Component is substantially free of any long chain branching. Substantially free of any long chain branching, as used herein, refers to an ethylene polymer substituted with less than 0.1 long chain branches per 1000 carbons or less than 0.01 long chain branches per 1000 carbons. The presence of long chain branches is can be determined according to the methods known in the art, as described above.

The LMW Component makes up 40 weight percent to 65 weight percent of the polyethylene resins in the composition. In some embodiments, the LMW Component can make up at least 42 weight percent of the polyethylene resins in the composition, or at least 45 weight percent, or at least 50 weight percent, and can make up at most 62 weight percent of the polyethylene resins in the composition, or at most 60 weight percent, or at most 58 weight percent.

Properties of the Overall Composition

The high-density polyethylene composition (having both the HMW Component and the LMW Component) has a density of at least 0.953 g/cm$^3$. In some embodiments, the density of the high-density polyethylene composition can be at least 0.954 g/cm$^3$, or at least 0.955 g/cm$^3$. In some embodiments, the density of the high-density polyethylene composition can be at most 0.965 g/cm$^3$, or at most 0.963 g/cm$^3$, or at most 0.960 g/cm$^3$, or at most 0.958 g/cm$^3$.

The high-density polyethylene composition has a melt index ($I_2$) from 4 to 19 g/10 minutes. In some embodiments, the melt index ($I_2$) can be at least 4.5 g/10 min., or at least 4.6 g/10 min., or at least 5.5 g/10 min., or at least 6.0 g/10 min., or at least 6.3 g/10 min, and can be at most 15.0 g/10 min., or at most 14.0 g/10 min, or at most 10.0 g/10 min.

In some embodiments, the high-density polyethylene composition can have a flow index ($I_{21}$) that is at least 300 g/10 min., or at least 400 g/10 min, or at least 475 g/10 min, and can have a flow index ($I_{21}$) that is at most 1000 g/10 min. or at most 800 g/10 min. or at most 600 g/10 min.

In some embodiments, the high-density polyethylene composition can have a flow rate ratio ($I_{21}/I_2$) (also known as melt flow ratio) that is at least 50, or at least 60, or at least 75, and can have a flow rate ratio ($I_{21}/I_2$) that is at most 120, or at most 100, or at most 85.

In some embodiments, the number average molecular weight ($M_n$) of the high-density polyethylene composition can be at least 3000 g/mol., or at least 3500 g/mol., or at least 4700 g/mol, and can be at most 15,000 g/mol., or at most 9,000 g/mol., or at most 6000 g/mol.

In some embodiments, the weight average molecular weight ($M_w$) of the high-density polyethylene composition can be at least 30,000 g/mol., or at least 50,000 g/mol., or at least 65,000, and can be at most 150,000 g/mol., or at most 110,000 g/mol., or at most 85,000 g/mol.

In some embodiments, the molecular weight distribution ($M_w/M_n$) of the high-density polyethylene composition can be at least 7.5, or at least 10, or at least 12, or at least 13, or at least 13.5, and can be at most 25, or at most 23, or at most 20, or at most 16.

In some embodiments, the high-density polyethylene composition can have an environmental stress crack resistance ($F_{50}$) of at least 100 hours measured using the Test Method listed hereinafter or at least 200 hours, or at least 300 hours, or at least 350 hours. In some embodiments, the high-density polyethylene composition can have an environmental stress crack resistance ($F_{50}$) of at least 400 hours. In some embodiments, the high-density polyethylene composition can have an environmental stress crack resistance ($F_{50}$) of at most 1000 hours measured according to ASTM D-1693, condition B at 50 °C, and using 10 percent Branched Octylphenoxy Poly (Ethyleneoxy) Ethanol aqueous solution or at most 800 hours or at most 500 hours.

Environmental stress crack resistance (ESCR) in polyethylene compositions is often related to the melt index ($I_2$) of the composition. Manufacturers often prefer to maximize the melt index of a resin while maintaining adequate ESCR, rather than maximizing ESCR. In the inventive compositions according to some embodiments disclosed herein, the environmental stress crack resistance ($F_{50}$) (measured as described above) can satisfy the following formula:

$$400-29.2*(MI)[(10\text{-min}*hr/g)]<(F_{50})<500$$

wherein $F_{50}$ is the environmental stress crack resistance in hours, MI is the melt index (b) of the polymer composition in g/10 minutes.

The high-density polyethylene composition may further include additional components such as other polymers, and/or additives. Such additives include, but are not limited to, antistatic agents, color enhancers, dyes, lubricants, fillers, pigments, primary antioxidants, secondary antioxidants, processing aids, UV stabilizers, nucleators, and combinations thereof. The high-density polyethylene composition optionally compromises less than 10 percent additives, based on the weight of the high-density polyethylene composition. All individual values and subranges from less than 10 weight percent are included herein and disclosed herein; for example, the high-density polyethylene composition may optionally comprise less than 5 percent additives, based on the weight of the high-density polyethylene composition; or in the alternative, less than 1 percent additives, based on the weight of the high-density polyethylene composition; or in another alternative, less than 0.5 percent additives, based on the weight of the high-density polyethylene composition. Antioxidants, such as IRGAFOS 168 and IRGANOX 1010, are commonly used to protect the polymer from thermal and/or oxidative degradation. IRGANOX 1010 is pentaerythritol tetrakis[3-[3,5-di-tert-butyl-4-hydroxyphenyl] propionate, which is commercially available from Ciba Geigy Inc. IRGAFOS 168 is tris (2,4 di-tert-butylphenyl) phosphite, which is commercially available from Ciba Geigy Inc.

In some embodiments, the composition contains less than 10 weight percent of polyethylene homopolymers and copolymers other than the HMW Component and the LMW Component or less than 5 percent, or less than 2 percent, or less than 1 percent.

The inventive high-density polyethylene composition may further be blended with other polymers. Such other polymers are generally known to a person of ordinary skill in the art. Blends comprising the inventive high-density polyethylene composition are formed via any conventional methods. For example, the selected polymers are melt blended via a single or twin screw extruder, or a mixer, e.g. a Kobe LCM or KCM mixer, a Banbury mixer, a Haake mixer, a Brabender internal mixer.

In some embodiments, blends containing the inventive high-density polyethylene composition comprise at least 40 percent by weight of the inventive high-density polyethylene composition, based on the total weight of the blend. All individual values and subranges in the range of at least 40 weight percent are included herein and disclosed herein; for example, the blend may comprise at least 50 percent by weight of the inventive high-density polyethylene composition, based on the total weight of the blend; or in the alternative, the blend may comprise at least 60 percent by weight of the inventive high-density polyethylene composition, based on the total weight of the blend; or in the alternative, the blend may comprise at least 70 percent by weight of the inventive high-density polyethylene composition, based on the total weight of the blend; or in the alternative, the blend may comprise at least 80 percent by weight of the inventive high-density polyethylene composition, based on the total weight of the blend; or in the alternative, the blend may comprise at least 90 percent by weight of the inventive high-density polyethylene composition, based on the total weight of the blend; or in the alternative, the blend may comprise at least 95 percent by weight of the inventive high-density polyethylene composition, based on the total weight of the blend; or in the alternative, the blend may comprise at least 99 percent by weight of the inventive high-density polyethylene composition, based on the total weight of the blend.

The molecular weight distribution of the inventive compositions may be measured using gel permeation chromatography as described in the Test Methods below and may be represented by a plot or graph of differential weight fraction (dWf) versus each molecular weight increment, wherein the molecular weight increments are expressed as the log of the molecular weight (log M). Differential weight fraction is the weight fraction of polymer in each molecular weight increment. For example, a GPC chromatogram of inventive example 1 and inventive example 2 (described below) is provided in FIG. 1. As shown in FIG. 1, the inventive polyethylene compositions can be represented by a plot of dWf versus log M, where the graph features a first peak between log M of 3.5 and 4.5 and a second peak between 4.5 and 5.5 as peaks corresponding to the LMW and HMW components, respectively, and a local minimum dWf value between the component peaks. As shown in FIG. 1, there is at least some separation between the first peak between log M of 3.5 and 4.5 and the second peak between log M of 4.5 and 5.5, and the local minimum is between the first peak and the second peak. The term "peak" as used herein refers to an upward sloping region followed by a downward sloping region on a graph.

As noted above, and shown in FIG. 1, a graph of the molecular distribution of the inventive polyethylene compositions disclosed herein can be provided where the graph shows molecular weight increments (M) on a logarithmic scale (log M) and shows the differential weight fraction (dWf) for each molecular weight increment. In some embodiments, the graph of the molecular distribution of the polyethylene composition comprises: a. a first peak between log M of 3.5 and 4.5, b. a second peak between log M of 4.5 and 5.5, and c. a local minimum between the first peak and the second peak, wherein the local minimum dWf value is less than 90% of the dWf value of the lower of the first and second peaks, and wherein the first peak is the highest peak between log M of 3.5 and 4.5, the second peak is the highest peak between log M of 4.5 and 5.5, and the local minimum is the lowest point between the first peak and the second peak. In some embodiments, the first peak can be between log M of 3.75 and 4.25. In some embodiments, the local minimum can be no more than 88% of the dWf value of the lower of the first and second peaks, or no more than 86% of the dWf value of the lower of the first and second peaks.

Process to Produce the Composition

Compositions of the present invention can be made by polymerization of ethylene and comonomers using metallocene catalysts in a dual-stage polymerization system having two polymerization reactors in series, wherein one component is mostly produced in the first reactor and the other component is mostly produced in the second reactor. Suitable dual stage polymerization systems are well-known and described in numerous patent publications, such as US2007/0043177A1, US2010/0084363A1, U.S. Pat. No. 9,988,473B2, EP0,503,791A1 and EP0,533,452A1.

Examples of dual sequential polymerization systems include, but are not limited to, gas phase polymerization/gas phase polymerization; gas phase polymerization/liquid phase polymerization; liquid phase polymerization/gas phase polymerization; liquid phase polymerization/liquid phase polymerization; slurry phase polymerization/slurry phase polymerization; liquid phase polymerization/slurry phase polymerization; slurry phase polymerization/liquid phase polymerization; slurry phase polymerization/gas phase polymerization; and gas phase polymerization/slurry phase polymerization. A dual gas phase polymerization process, e.g., gas phase polymerization/gas phase polymerization, is suitable for many embodiments.

In production, a dual sequential polymerization system connected in series, as described above, may be used. The HMW Component can be produced in the first stage of the dual sequential polymerization system, and the LMW Component can be prepared in the second stage of the dual sequential polymerization system. Alternatively, the LMW Component can be made in the first stage of the dual sequential polymerization system, and the HMW Component can be made in the second stage of the dual sequential polymerization system.

In one embodiment, the HMW Component is made primarily in the first stage reaction, and the LMW Component is made primarily in the second stage reaction. Ethylene and one or more alpha-olefin comonomers are continuously fed into a first reactor with a catalyst system including a cocatalyst, hydrogen, and optionally inert gases and/or liquids under conditions suitable to polymerize the ethylene and comonomers to produce the HMW Component. Examples of suitable inert gases and liquids include nitrogen, isopentane or hexane. The HMW Component/active catalyst mixture is then continuously transferred from the first reactor to a second reactor, such as in batches. Ethylene, hydrogen, cocatalyst, and optionally comonomer, inert gases and/or liquids are continuously fed to the second reactor, and the reactor is maintained under conditions suitable to produce the LMW Component. The inventive high-density polyethylene composition is removed from the second reactor. One mode is to take batch quantities of HMW Component from the first reactor, and transfer these to the second reactor using the differential pressure generated by a recycled gas compression system.

Examples of suitable catalysts include hafnium-containing metallocene catalyst system. Useful examples include silica supported hafnium transition metal metallocene methylalumoxane catalysts systems, such as those described in the following US patents: U.S. Pat. Nos. 6,242,545 and 6,248,845 and spray-dried hafnium transition metal metallocene methylalumoxane catalysts systems such as those described in U.S. Pat. No. 8,497,330. Spray-dried hafnium or zirconium transition metal metallocene catalyst systems are particularly suitable.

One suitable catalyst system is made by contacting bis(n-propylcyclopentadienyl)hafnium $X_2$ complex, wherein each X independently is Cl, methyl, 2,2-dimethylpropyl, —$CH_2Si(CH_3)_3$, or benzyl ("bis(n-propylcyclopentadienyl) hafnium $X_2$"), with an activator. The activator may comprise a methylaluminoxane (MAO). The catalyst is available from The Dow Chemical Company, Midland, Michigan, USA or may be made by methods described in the art. An illustrative method is described later for making a spray-dried catalyst system.

The polymerization catalyst may be fed into a polymerization reactor(s) in "dry mode" or "wet mode". The dry mode is a dry powder or granules. The wet mode is a suspension in an inert liquid such as mineral oil or the ($C_5$-$C_{20}$)alkane(s). The bis(n-propylcyclopentadienyl)hafnium $X_2$ may be unsupported when contacted with an activator, which may be the same or different for different catalysts. Alternatively, the bis(n-propylcyclopentadienyl) hafnium $X_2$ may be disposed by spray-drying onto a solid support material prior to being contacted with the activator(s). The solid support material may be uncalcined or calcined prior to being contacted with the catalysts. The solid support material may be a hydrophobic fumed silica (e.g., a fumed silica treated with dimethyldichlorosilane). The unsupported or supported catalyst system may be in the form of a powdery, free-flowing particulate solid.

Support material. The support material may be an inorganic oxide material. The terms "support" and "support material" are the same as used herein and refer to a porous inorganic substance or organic substance. In some embodiments, desirable support materials may be inorganic oxides that include Group 2, 3, 4, 5, 13 or 14 oxides, alternatively Group 13 or 14 atoms. Examples of inorganic oxide-type support materials are silica, alumina, titania, zirconia, thoria, and mixtures of any two or more of such inorganic oxides. Examples of such mixtures are silica-chromium, silica-alumina, and silica-titania.

The inorganic oxide support material is porous and has variable surface area, pore volume, and average particle size. In some embodiments, the surface area is from 50 to 1000 square meter per gram ($m^2/g$) and the average particle size is from 20 to 300 micrometers (μm). Alternatively, the pore volume is from 0.5 to 6.0 cubic centimeters per gram ($cm^3/g$) and the surface area is from 200 to 600 $m^2/g$. Alternatively, the pore volume is from 1.1 to 1.8 $cm^3/g$ and the surface area is from 245 to 375 $m^2/g$. Alternatively, the pore volume is from 2.4 to 3.7 $cm^3/g$ and the surface area is from 410 to 620 $m^2/g$. Alternatively, the pore volume is from 0.9 to 1.4 $cm^3/g$ and the surface area is from 390 to 590 $m^2/g$. Each of the above properties are measured using conventional techniques known in the art.

The support material may comprise silica, alternatively amorphous silica (not quartz), alternatively a high surface area amorphous silica (e.g., from 500 to 1000 $m^2/g$). Such silicas are commercially available from several sources including the Davison Chemical Division of W.R. Grace and Company (e.g., Davison 952 and Davison 955 products), and PQ Corporation (e.g., ES70 product). The silica may be in the form of spherical particles, which are obtained by a spray-drying process. Alternatively, MS3050 product is a silica from PQ Corporation that is not spray-dried. As procured, these silicas are not calcined (i.e., not dehydrated). Silica that is calcined prior to purchase may also be used as the support material.

Prior to being contacted with a catalyst, the support material may be pre-treated by heating the support material in air to give a calcined support material. The pre-treating comprises heating the support material at a peak temperature from 350° to 850 °C, alternatively from 400° to 800 °C, alternatively from 400° to 700 °C, alternatively from 500° to 650 °C and for a time period from 2 to 24 hours, alternatively from 4 to 16 hours, alternatively from 8 to 12 hours, alternatively from 1 to 4 hours, thereby making a calcined support material. The support material may be a calcined support material.

Each polymerization catalyst is activated by contacting it with an activator. The activator for each polymerization catalyst may be the same or different and independently may be a Lewis acid, a non-coordinating ionic activator, or an ionizing activator, or a Lewis base, an alkylaluminum, or an alkylaluminoxane (alkylalumoxane). The alkylaluminum may be a trialkylaluminum, alkylaluminum halide, or alkylaluminum alkoxide (diethylaluminum ethoxide). The trialkylaluminum may be trimethylaluminum, triethylaluminum ("TEAl"), tripropylaluminum, or tris(2-methylpropyl)aluminum. The alkylaluminum halide may be diethylaluminum chloride. The alkylaluminum alkoxide may be diethylaluminum ethoxide. The alkylaluminoxane may be a methylaluminoxane (MAO), ethylaluminoxane, 2-methylpropylaluminoxane, or a modified methylaluminoxane (MMAO). Each alkyl of the alkylaluminum or alkylaluminoxane independently may be a (C1-C7)alkyl, alternatively a ($C_1$-$C_6$) alkyl, alternatively a ($C_1$-$C_4$)alkyl. The molar ratio of activator's metal (Al) to a particular catalyst compound's metal (catalytic metal, e.g., Hf) may be 1000:1 to 0.5:1, alternatively 300:1 to 1:1, alternatively 150:1 to 1:1. Suitable activators are commercially available.

Once the activator and the bis(n-propylcyclopentadienyl) hafnium $X_2$ contact each other, the catalyst system is activated, and activator species may be made in situ. The activator species may have a different structure or composition than the catalyst and activator from which it is derived and may be a by-product of the activation of the catalyst or may be a derivative of the by-product. The activator species may be a derivative of the Lewis acid, non-coordinating ionic activator, ionizing activator, Lewis base, alkylaluminum, or alkylaluminoxane, respectively.

Each contacting step between activator and catalyst independently may be done either in a separate vessel outside a polymerization reactor or in a feed line to the reactor.

The temperature in each reactor is generally 70 °C to 110 °C The pressure is generally 1400 kPA to 3200 kPa.

The molecular weight of each component is controlled by the ratio of hydrogen to ethylene in the reactor. In production of the HMW Component, the molar ratio of hydrogen to ethylene is generally between 0 and 0.0015. In production of the LMW Component, the molar ratio of hydrogen to ethylene is generally between 0.0010 and 0.010. It is well-known how to experimentally determine the best ratios to achieve the desired molecular weight for each component, based on the equipment and reactants being used.

After the inventive high-density polyethylene composition is withdrawn from the polymerization reaction system, it is generally transferred to a purge bin under inert atmosphere conditions. Subsequently, the residual hydrocarbons are removed, and moisture is introduced to reduce any residual aluminum alkyls and any residual catalysts before the inventive high-density polyethylene composition is exposed to oxygen. The inventive high-density polyethylene composition is optionally transferred to an extruder to be pelletized. Such pelletization techniques are generally known.

The inventive high-density polyethylene composition may optionally be melt screened in the pelletizing process. Subsequent to the melting process in the extruder, the molten composition is passed through one or more active screens (positioned in series of more than one) with each active screen having a micron retention size of from 2 to 400 (2 to $4\times10^{-5}$ m), or 2 to 300 (2 to $3\times10^{-5}$ m), or 2 to 70 (2 to $7\times10^{-6}$ m), at a mass flux of 5 to 100 lb/hr/in t (1.0 to 20 kg/s/$m^2$). Such further melt screening is disclosed in U.S. Pat. No. 6,485,662.

Additives described above, such as antistatic agents, color enhancers, dyes, lubricants, fillers, pigments, primary antioxidants, secondary antioxidants, processing aids, UV stabilizers, nucleators, and combinations thereof, are generally added during the pelletization process.

Methods to Mold the Composition and Molded Articles

The inventive high-density polyethylene composition may be used to manufacture shaped articles. Such articles may include, but are not limited to, closure devices such as bottle caps, wire cable jacketing and conduit pipes Suitable conversion techniques to make shaped articles include, but are not limited to, wire coating, pipe extrusion, compression molding, extrusion, pultrusion, and calendering. Such techniques are generally well known. Common techniques include wire coating, pipe extrusion, compression molding, and injection molding, or are selected from injection molding and compression molding. These techniques are well-known and are generally described in the Background of this Application.

Closure devices such as bottle caps including the inventive high-density polyethylene composition exhibit improved processability while maintaining satisfactory environmental stress crack resistance. Such bottle caps are adapted to withstand the pressure of carbonated drinks. Such bottle caps further facilitate closure, and sealing of a bottle, i.e. optimum torque provided by a machine to screw the cap on the bottle, or unsealing a bottle, i.e. optimum torque provide by a person to unscrew the cap.

EXAMPLES

The following examples are provided in order to further illustrate the invention and are not to be construed as limiting.

Materials

Antioxidant 1: Tris(2,4-di-tert-butylphenyl)phosphite, obtained as IRGAFOS 168 from BASF.

Catalyst: bis(n-propylcyclopentadienyl)hafnium dimethyl. CAS no. 255885-01-9. The catalyst can be made according to Example 7 of U.S. Pat. No. 6,175,027 B1, except $HfCl_4$ is used in place of $ZrCl_4$ to give bis(n-propylcyclopentadienyl)hafnium dichloride, and then reacting same with methyl magnesium chloride to give bis(n-propylcyclopentadienyl)hafnium dimethyl. The catalyst is also commercially available from BOC Sciences, a brand of BOCSCI Inc., Shirley, New York, USA and from Boulder Scientific.

Continuity Additive: CA-300 from Univation Technologies, LLC, Houston, Texas, USA.

Activator: methyl aluminoxane (MAO).

Ethylene ("$C_2$"): $CH_2{=}CH_2$.

1-Hexene ("$C_6$"): $CH_2{=}CH(CH_2)_3CH_3$

ICA: Isopentane

Molecular hydrogen gas: $H_2$.

Mineral oil: Sonneborn HYDROBRITE 380 PO White.

Preparation of Spray-Dried Catalyst System 1 (sd-cat-1): Bis(Propylcyclopentadienyl)Hafnium Dimethyl Spray-Dried on Silica A batch of the catalyst system (sd-Cat-1) is prepared as a dry powder according to U.S. Pat. No. 8,497,330 B2, column 22, lines 48 to 67.

Another batch of the sd-Cat-1 is prepared as follows: Use a Büchi B-290 mini spray-drier contained in a nitrogen atmosphere glovebox. Set the spray drier temperature at 165 °C and the outlet temperature at 60° to 70 °C Mix fumed silica (Cabosil TS-610, 3.2 g), MAO in toluene (10 wt %, 21 g), and bis(propylcyclopentadienyl)hafnium dimethyl (0.11 g) in toluene (72 g). Introduce the resulting mixture into an atomizing device, producing droplets that are then contacted with a hot nitrogen gas stream to evaporate the liquid therefrom, thereby making a powder. Separate the powder from the gas mixture in a cyclone separator, and collect the sd-Cat-1 as a powder (3.81 g) in a cone can.

The two batches are deemed to be substantially equivalent and are used interchangeably. The sd-Cat-1 may be fed to a gas phase polymerization reactor as a dry powder or as a slurry in mineral oil.

Preparation of Inventive Examples 1 and 2 (IE1 and IE2) Comparative Examples 1 and 2 (CE1 and CE2)

Use the spray-dried catalyst system prepared as described above in Preparation of sd-Cat-1. Feed the sd-Cat-1 as a 16 weight percent solids slurry in mineral oil to a fluidized-bed gas phase polymerization dual reactor system comprising two Pilot FB-GPP Reactors (first reactor and second reactor) comprising beds of polyethylene granules. After reaching equilibrium in the first reactor, polymerize ethylene (C2) and 1-hexene (C6). Initiate polymerization in the first reactor by continuously feeding the dry sd-Cat-1 catalyst powder, ethylene, 1-hexene and hydrogen (H2) into the fluidized bed of polyethylene granules, while also feeding continuity additive CA-300 as a 20 wt % solution in mineral oil.

Withdraw the produced HMW PE constituent from the first reactor as a unimodal polyethylene polymer that contains active catalyst. Transfer the withdrawn material to the second reactor using second reactor gas as a transfer medium. Feed ethylene and hydrogen into the second reactor, but do not feed fresh sd-CAT-1 into the second reactor. Inert gases, nitrogen and isopentane make up the remaining gas composition in both the first and second FB-GPP reactor.

Polymerization conditions for the first and second reactors are reported in Table A. In Table A, "HMW Rx" means the gas phase polymerization reaction that makes the HMW PE constituent in the first reactor and "LMW Rx" means the gas phase polymerization reaction that makes the LMW PE constituent in the second reactor.

Comparative 2 (CE2) is prepared in the same manner as IE1 except SD-CAT-1 was fed as a dry powder.

TABLE A

Reactor Conditions for Examples

| | IE1 | | IE2 | | CE1 | | CE2 | |
|---|---|---|---|---|---|---|---|---|
| Reactor Operating Conditions | HMW Rx | LMW Rx | HMW Rx | LMW Rx | HMW Rx | LMW Rx | HMW Rx | LMW Rx |
| Temperature (° C.) | 93 | 85 | 85 | 85 | 85 | 85 | 93 | 85 |
| Pressure (kPa) | 2400 | 2411 | 2402 | 2369 | 2403 | 2391 | 2397 | 2544 |
| C2 Partial Pressure (kPa) | 401 | 1997 | 379 | 1379 | 517 | 1844 | 530 | 1552 |
| H2/C2 Molar Ratio | 0.00040 | 0.0060 | 0.00040 | 0.0060 | 0.00032 | 0.0060 | 0.00039 | 0.0060 |
| C6/C2 Molar Ratio | 0.0033 | 0.0000 | 0.0045 | 0.0000 | 0.0011 | 0.0000 | 0.0022 | 0.0000 |
| Isopentane (mol %) | 11.4 | 5.0 | 11.3 | 5.0 | 9.0 | 5.0 | 10.1 | 5.0 |
| 20 wt % CA-300 feed rate (cc/hr) | 2.4 | | 3.5 | | 3.5 | | 2.5 | |
| Production rate (kg/hr) | 13.3 | 13.7 | 12.9 | 16.7 | 16.6 | 11.5 | 12.9 | 16.2 |
| Bed Weight (kg) | 50 | 71 | 44 | 76 | 55 | 80 | 40 | 69 |
| Split (Wt %) | 49.3% | 50.7% | 43.7% | 56.3% | 58.9% | 41.1% | 44.3% | 55.7% |
| Catalyst feed rate* (g/hr) | 2.7 | | 2.7 | | 2.0 | | 3.0 | |

*dry solids basis

Formulating Inventive Examples IE1 and IE2 and Comparative Examples CE1 and CE2 with Additives Separately combine the IE1, IE2, CE1 and CE2 as granules with 1500 parts per million weight (ppmw) Antioxidant 1 (Irgafos 168). Feed the combination to a continuous mixer (LCM-100 from Kobe Steel, Ltd.), which is closed coupled to a gear pump and equipped with a melt filtration device and underwater pelletizing system to separately produce strands that are cut into pellets of stabilized polyethylene blends IE1, IE2, CE1 and CE2, respectively.

Testing and Properties.

Properties of stabilized IE1, IE2, CE1 and CE2 are tested using the Test Methods listed below. Properties of the HMW Component are measured on BHT-stabilized (2000 ppmw) samples of the granular resins directly from the first reactor. Table B shows the measured results and the complementary density for the LMW Component. Table B also shows the published properties for CONTINUUM™ DMDC-1250 NT 7 bimodal polyethylene resin and CONTINUUM™ DMDC-1270 NT 7 bimodal polyethylene resin, which are commercial resins sold by Dow, Inc. that are commonly used for caps and closures for carbonated soft drinks, plus published properties of high-MI bimodal polymers from U.S. Pat. No. 7,396,878B2. Density, melt-index and ESCR are all important qualities for resins used to make carbonated soft-drink caps and closures.

High load melt index or Flow Index, also referred to as $I_{21}$ or $I_{21.6}$, for ethylene-based polymers is determined according to ASTM D1238 at 190 °C, 21.6 kg.

Short-Chain Branching/Comonomer Content

The samples were prepared by adding ~100 mg of sample to 3.25 g of 1,1,2,2-tetrachlorethane (TCE), with 12 wt % as TCE-d2, in a Norell 1001-7 10 mm NMR tube. The solvent contained 0.025 M Cr(AcAc)3 as a relaxation agent. Sample tubes were purged with N2, capped, and sealed with Teflon tape before heating and vortex mixing at 145 °C to achieve a homogeneous solution.

13C NMR was performed on a Bruker AVANCE 600 MHz spectrometer equipped with a 10 mm extended temperature cryoprobe. The data was acquired using a 7.8 second pulse repetition delay, 90-degree flip angles, and inverse gated decoupling, with a sample temperature of 120 °C. All measurements were made on non-spinning samples in locked mode. Samples were allowed to thermally equilibrate for seven minutes prior to data acquisition. The 13C NMR chemical shifts were internally referenced to the EEE triad at 30.0 ppm.

Content is determined as set out in ASTM 5017-17, Standard Test Method for Determination of Linear Low Density Polyethylene (LLDPE) Composition by Carbon-13 Nuclear Magnetic Resonance, ASTM International, West Conshohocken, P A, 2017, www.astm.org. Other useful publications include: ASTM D 5017-96; J. C. Randall et al., "NMR and Macromolecules" ACS Symposium series 247; J. C. Randall, Ed., Am. Chem. Soc., Washington, D.C., 1984, Ch. 9, and J. C. Randall in "Polymer Sequence Determination", Academic Press, New York (1977).

TABLE B

| Overall Resin Properties | | | | | | | | | | | | | | | | | |
|---|---|---|---|---|---|---|---|---|---|---|---|---|---|---|---|---|---|
| | Overall Resin Properties | | | | | | | | | HMW Component Properties | | | | | | | LMW |
| | GPC (kg/mol) | | | SCB by NMR | | Melt Index (dg/min) | | | ESCR (hrs) | HMW | | I21 | GPC (kg/mol) | | | SCB by NMR | Comp Comp. |
| Resin | Mn | Mw | Mw/Mn | Branches/1KC | Density g/cm³ | I2 | I21 | I21/I2 | B, 10% | Comp Wt. % | Density g/cm³ | dg/min | Mn | Mw | Mw/Mn | Branches/1KC | Density g/cm³ |
| IE1 | 3.6 | 79.5 | 22 | 1.15 | 0.958 | 6.0 | 478 | 80 | 317 | 49.3 | 0.928 | 6.1 | 56.3 | 170.5 | 3.03 | 3.00 | 0.989 |
| IE2 | 5.0 | 70.3 | 14 | 1.61 | 0.956 | 7.3 | 560 | 77 | 448 | 40.5 | 0.925 | 7.1 | 59.3 | 163.6 | 2.76 | 4.30 | 0.978 |
| CE1 | 5.9 | 88.9 | 15 | 0.58 | 0.959 | 3.3 | 142 | 43 | 22 | 58.9 | 0.937 | 4.4 | 57.2 | 164.1 | 2.87 | 0.93 | 0.992 |
| CE2 | 6.2 | 91.7 | 15 | 1.71 | 0.958 | 3.1 | 204 | 66 | 213 | 44.1 | 0.933 | 4.4 | 67.2 | 179.9 | 2.68 | 1.71 | 0.979 |
| DMDC-1250 | | | | | 0.955 | 1.5 | | | 272 | | | | | | | | |
| DMDC-1270 | | | | | 0.955 | 2.5 | | | 100 | | | | | | | | |
| Lit1 | | | | | 0.956 | 6.6 | | | 34 | 43% | 0.934 | 0.7 | | | n/a | | 0.973 |
| Lit2 | | | | | 0.956 | 9.3 | | | 7 | 24% | 0.911 | 0.46 | | | 2.5 | | 0.971 |
| Lit3 | | | | | 0.957 | 10 | | | 5 | 22% | 0.911 | 0.46 | | | 2.5 | | 0.971 |
| Lit4 | | | | | 0.958 | 5.4 | | | 60 | 24% | 0.919 | 0.45 | | | 2.6 | | 0.971 |

Examples Lit1-Lit 4 are comparative examples taken from U.S. Pat. No. 7,396,878B2.
Lit1 = 10a/10b blend.
Lit2 = 4a/4b Blend.
Lit3 = 5a/5b blend.
Lit4 = 7a/7b blend.

Test Methods

Unless otherwise noted, the values reported herein were determined according to the following test methods.

Density

Samples that are measured for density are prepared according to ASTM D4703. Measurements are made within one hour of sample pressing using ASTM D792, Method B.

Melt Index

Melt index, also referred to as $I_2$ or $I_{2.16}$, for ethylene-based polymers is determined according to ASTM D1238 at 190 °C, 2.16 kg.

Gel Permeation Chromatography (GPC) Molecular Weight Determination

Polymer molecular weight is characterized by high temperature gel permeation chromatography (GPC). The chromatographic system consists of a Polymer Laboratories "GPC-220 high temperature" chromatograph, equipped with a Precision Detectors (Amherst, Mass.) 2-angle laser light scattering detector, Model 2040, and a 4-capillary differential viscometer detector, Model 210R, from Viscotek (Houston, Tex.). The 15° angle of the light scattering detector is used for calculation purposes.

Data collection is performed using PolymerChar (Valencia, Spain) GPC One Instrument Control. The system is equipped with an on-line solvent degas device from Polymer Laboratories. The carousel compartment and column compartment are operated at 150 °C. The columns are four Polymer Laboratories "Mixed A" 20 micron columns, and one 20 um guard column. The polymer solutions are prepared in 1,2,4 trichlorobenzene (TCB). The samples are prepared at a concentration of 0.1 grams of polymer in 50 ml of solvent. The chromatographic solvent and the sample preparation solvent contain 200 ppm of butylated hydroxytoluene (BHT). Both solvent sources are nitrogen sparged. Polyethylene samples are stirred gently at 160 °C for 4 hours. The injection volume is 200 µl, and the flow rate is 1.0 ml/minute.

Calibration of the GPC column set is performed with 21 narrow molecular weight distribution polystyrene standards. The molecular weights of the standards range from 580 to 8,400,000, and are arranged in 6 "cocktail" mixtures, with at least a decade of separation between individual molecular weights. The polystyrene standard peak molecular weights are converted to polyethylene molecular weights using the following equation (as described in Williams and Ward, J. Polym. Sci., Polym. Let., 6, 621 (1968)):

$$M_{polyethylene}=A\times(M_{polystyrene})^B,$$

where M is the molecular weight, A has a value of 0.4316, and B is equal to 1.0.

A fifth order polynomial is used to fit the respective polyethylene-equivalent calibration points. The total plate count of the GPC column set is performed with Eicosane (prepared at 0.04 g in 50 milliliters of TCB, and dissolved for 20 minutes with gentle agitation.) The plate count and symmetry are measured on a 200 microliter injection according to the following equations:

$$PlateCount = 5.54*\left(\frac{RV \text{ at Peak Maximum}}{\text{Peak Width at 1/2 height}}\right)^2$$

where RV is the retention volume in milliliters, and the peak width is in milliliters.

$$\text{Symmetry} = \frac{\left(\text{Rear Peak Width at } \frac{1}{10} \text{ height}\right) - (RV \text{ at Peak Maximum})}{(RV \text{ at Peak Maximum}) - \left(\text{Front Peak Width at } \frac{1}{10} \text{ height}\right)},$$

where RV is the retention volume in milliliters, and the peak width is in milliliters.

The calculations of Mn, Mw, and Mz are based on GPC results using the RI detector are determined from the following equations:

$$\overline{Mn} = \frac{\sum^i RI_i}{\sum^i (RI_i/Mcalibration_i)},$$

$$\overline{Mw} = \frac{\sum^i (RI_i * Mcal_i)}{\sum^i (RI_i)},$$

-continued $$\overline{Mz} = \frac{\sum^i (RI_i * Mcal_i)^2}{\sum^i (RI_i * Mcal_i)}$$

In order to monitor the deviations over time, which may contain an elution component (caused by chromatographic changes) and a flow rate component (caused by pump changes), a late eluting narrow peak is generally used as a "marker peak". A flow rate marker is therefore established based on decane flow marker dissolved in the eluting sample. This flow rate marker is used to linearly correct the flow rate for all samples by alignment of the decane peaks. Any changes in the time of the marker peak are then assumed to be related to a linear shift in both flow rate and chromatographic slope. The preferred column set is of 20 micron particle size and "mixed" porosity to adequately separate the highest molecular weight fractions appropriate to the claims. The plate count for the chromatographic system (based on eicosane as discussed previously) should be greater than 20,000, and symmetry should be between 1.00 and 1.12.

Resin Environmental Stress Crack Resistance (ESCR)

The resin environmental stress crack resistance (ESCR) (F50) is measured according to ASTM D-1693-01, Standard Test Method for Environmental Stress-Cracking of Ethylene Plastics, ASTM International, West Conshohocken, P A, 2001, www.astm.org, condition B at 50 °C using 10% Tergitol NP-9. The ESCR value is reported as $F_{50}$, the calculated 50 percent failure time from the probability graph.

We claim:

1. A high-density polyethylene composition comprising:

a) 35 to 60 weight percent of a higher molecular weight ethylene copolymer component (HMW Component) having:

i. a flow index ($I_{21}$) of at least 4 g/10 min, ii. a density of from 0.920 to 0.931 g/cm$^3$, and iii. a molecular weight distribution (Mw/Mn) of less than 4.0, and b) 40 to 65 weight percent of a lower molecular weight ethylene homopolymer or copolymer component (LMW Component) having a complementary density (CD) of greater than 0.975 g/cm$^3$ according to the following formula, wherein weight percentages are based on percentages of the combined weight of the HMW and LMW Components only:

$$CD = \frac{LMW \text{ Component Weight Percent/100}}{\left(\frac{1}{\text{Overall Density}}\right) - \left(\frac{HMW \text{ Component Weight Percent/100}}{HMW \text{ Component Density}}\right)};$$

and wherein the high-density polyethylene composition has overall:

i. a melt index ($I_2$) of 4 to 19 g/10 min, and ii. a density of greater than 0.953 g/cm$^3$.

2. The polyethylene composition of claim 1, wherein the polyethylene composition has a molecular weight distribution (Mw/Mn) greater than 7.5.

3. The polyethylene composition of claim 1, wherein the polyethylene composition has a molecular weight distribution (Mw/Mn) from 10 to 25.

4. The polyethylene composition of claim 1, wherein the density of the polyethylene composition is from 0.955 to 0.967 g/cm$^3$.

5. A bimodal polyethylene composition comprising a higher molecular weight ethylene copolymer component (HMW Component) and a lower molecular weight ethylene homopolymer or copolymer component (LMW Component), wherein:

a) the composition has a density from 0.953 to 0.965 g/cm$^3$;

b) the composition has a molecular weight distribution (Mw/Mn) from 8 to 25;

c) the composition has a melt index ($I_2$) of from 5.5 to 19 g/10 min; and d) the composition has an ESCR of at least 300 hours, as measured by ASTM D-1693, condition B at 50 °C, using 10 percent Branched Octylphenoxy Poly (Ethyleneoxy) Ethanol.

6. The polyethylene composition of claim 1, wherein the polyethylene composition has a melt index ($I_2$) from 5.5 to 10 g/10 minutes.

7. The polyethylene composition of claim 1, wherein the polyethylene composition has a flow index ($I_{21}$) of at least 300 g/10 minutes.

8. The polyethylene composition of claim 1, wherein the HMW Component makes up from 40 to 50 weight percent of the polyethylene composition, based on the combined weight of the HMW Component and the LMW Component.

9. The polyethylene composition of claim 1, wherein the HMW Component has a molecular weight distribution (Mw/Mn) from 2.1 to 3.6.

10. The polyethylene composition of claim 1, wherein the complementary density of the LMW Component is in the range from 0.977 to 0.990 g/cm$^3$.

11. The polyethylene composition of claim 1, wherein the polyethylene composition has an environmental stress crack resistance ($F_{50}$) (measured by ASTM D-1693, condition B at 50 °C, using 10 percent Branched Octylphenoxy Poly (Ethyleneoxy) Ethanol) that satisfies the following formula:

$$400-29.2*(MI)[(10-min*hr/g)]<(F_{50})<500\text{ hours}$$

wherein $F_{50}$ is the environmental stress crack resistance in hours and MI is the melt index ($I_2$) of the polyethylene composition in g/10 minutes and wherein environmental stress crack resistance ($F_{50}$) is at least 100 hours.

12. The polyethylene composition of claim 1, wherein the polyethylene composition has an environmental stress crack resistance ($F_{50}$) from 350 to 800 hours when tested according to ASTM D-1693-01, condition B at 50 °C using 10% Tergitol NP-9.

13. The polyethylene composition of claim 1, wherein a graph of the molecular distribution of the polyethylene composition, which shows molecular weight increments (M) on a logarithmic scale (log M) and shows the differential weight fraction (dWf) for each molecular weight increment, comprises:

a) a first peak between log M of 3.5 and 4.5, b) a second peak between log M of 4.5 and 5.5, and c) a local minimum between the first peak and the second peak, wherein the local minimum dWf value is less than 90% of the dWf value of the lower of the first and second peaks, and wherein the first peak is the highest peak between log M of 3.5 and 4.5, the second peak is the highest peak between log M of 4.5 and 5.5, and the local minimum is the lowest point between the first peak and the second peak.

14. A molded article formed from the polyethylene composition of claim 1.

15. The molded article of claim 14, wherein the molded article is a closure for a beverage bottle.

* * * * *